United States Patent [19]

Seseke-Koyro et al.

[11] Patent Number: 5,585,085
[45] Date of Patent: *Dec. 17, 1996

[54] REMOVAL OF WATER AND/OR HYDROCARBONS FROM HYDROGEN FLUORIDE

[75] Inventors: Ulrich Seseke-Koyro, Vellmar; Andreas Grossmann, Sehnde; Werner Rudolph, Hanover, all of Germany

[73] Assignee: Solvay Fluor und Derivate GmbH, Hanover, Germany

[*] Notice: The portion of the term of this patent subsequent to Oct. 28, 2012, has been disclaimed.

[21] Appl. No.: 969,711

[22] Filed: Oct. 28, 1992

[30] Foreign Application Priority Data

Oct. 31, 1991 [DE] Germany .......................... 41 35 917.8

[51] Int. Cl.$^6$ ...................................................... C01B 7/19
[52] U.S. Cl. ............................................. 423/484; 423/488
[58] Field of Search ............................... 423/240 R, 483, 423/484, 486, 488; 210/753, 29

[56] References Cited

U.S. PATENT DOCUMENTS

| | | | |
|---|---|---|---|
| 3,166,379 | 1/1965 | Bradely et al. | 423/484 |
| 3,923,963 | 12/1975 | Rideout | 423/486 |
| 4,668,497 | 5/1987 | Miki | 423/488 |
| 4,818,513 | 4/1989 | Trager et al. | 423/488 |
| 4,911,792 | 3/1990 | Manzer | 203/39 |

FOREIGN PATENT DOCUMENTS

| | | | |
|---|---|---|---|
| 160737 | 11/1986 | European Pat. Off. | |
| 61-151002 | 7/1986 | Japan. | |
| 61-151023 | 7/1986 | Japan. | |
| 61-15100 | 7/1986 | Japan | 423/484 |

*Primary Examiner*—Benjamin R. Fuller
*Assistant Examiner*—Valerie Ann Lund
*Attorney, Agent, or Firm*—Evenson, McKeown, Edwards & Lenahan

[57] ABSTRACT

A process for removing water and/or carbon compounds from hydrogen fluoride by contacting the hydrogen fluoride to be purified with elemental fluorine.

3 Claims, No Drawings

REMOVAL OF WATER AND/OR HYDROCARBONS FROM HYDROGEN FLUORIDE

BACKGROUND OF THE INVENTION

This invention relates to a process for the removal of water and/or hydrocarbons from hydrogen fluoride.

Large amounts of hydrogen fluoride are used in the chemical industry, for example for the preparation of fluorine-containing inorganic or organic compounds. Hydrogen fluoride in the form of hydrofluoric acid is used, for example, as an etching agent. Some fields of use, for example electronics or optics, require purified hydrogen fluoride which must be essentially free from water and/or essentially free from hydrocarbons. Thus, there was a need for more useful methods of obtaining pure hydrogen fluoride essentially free of water and/or carbon compounds.

SUMMARY OF THE INVENTION

It was therefore the object of the present invention to provide a process which allows hydrogen fluoride to be obtained which is essentially free from water and/or hydrocarbons.

This and other objects are achieved in accordance with the present invention by providing a process for removing water and carbon compounds from hydrogen fluoride comprising the step of contacting the hydrogen fluoride with elemental fluorine.

DETAILED DESCRIPTION OF PREFERRED EMBODIMENTS

The process according to the invention for the removal of water and/or carbon compounds from hydrogen fluoride comprises bringing the hydrogen fluoride into contact with elemental fluorine.

The process according to the invention allows water or carbon compounds to be removed from hydrogen fluoride which is more or less pure. The process is advantageously applied to hydrogen fluoride which has a purity of not less than 95% by weight.

Of course, the process according to the invention can be used for purifying hydrogen fluoride contaminated with only one single carbon compound or with a mixture of carbon compounds.

As used herein, the term "carbon compounds" embraces organic carbon compounds, in particular hydrocarbons, for example aliphatic, cycloaliphatic or aromatic hydrocarbons, as well as monosubstituted or polysubstituted aliphatic, cyclic or aromatic hydrocarbons. Examples of carbon compounds which can be removed from hydrogen fluoride in accordance with the invention include aliphatic hydrocarbons such as methane, ethane, propane, butane, pentane or hexane; cyclic hydrocarbons such as cyclohexane or methylcyclohexane; and aromatic hydrocarbons such as benzene, toluene, xylene or mesitylene.

It is also possible to remove carbon compounds which contain hetero atoms. For example, aliphatic, cyclic or aromatic hydrocarbons which are substituted by one or more halogen atoms or by one or more substituents containing hetero atoms, or hydrocarbons containing one or more hetero atoms in the carbon chain, can also be removed.

The water which is present in the hydrogen fluoride to be purified is decomposed using elemental fluorine to yield hydrogen fluoride and oxygen. Carbon compounds are usually decomposed to give fluorinated methanes. For example, hydrocarbons are reacted to yield carbon tetrafluoride. Halogenated carbon compounds react to give methane compounds containing fluorine and halogen.

It is advantageous to employ the elemental fluorine in an amount not less than that stoichiometrically required for complete removal of the water and/or the carbon compound or compounds contained in the starting hydrogen fluoride. The fluorine is preferably employed in excess, for example from 2 to 8 times the amount required stoichiometrically for the removal of water and carbon compounds and optionally other impurities.

The fluorine can be introduced into the process in pure form or as a mixture with an inert gas. Mixtures which can be used include, for example, mixtures of fluorine and a noble gas or nitrogen. Moreover, it is also possible to employ mixtures of fluorine and hydrogen fluoride.

The process according to the invention is carried out advantageously at a temperature in the range from −20° C. to 150° C., preferably from 20° C. to 100° C.

The process can be carried out under subatmospheric pressure, at ambient pressure, or under superatmospheric pressure. For example, it can be carried out at a pressure from 0.5 to 10 bar or more. It is desirable to carry out the process either under ambient pressure or under superatmospheric pressure, for example in a range from ambient pressure to 7 bar.

The degradation products which are formed in particular from carbon compounds can be removed from the purified hydrogen fluoride by subsequent distillation or even by simply applying subatmospheric pressure to condense them.

The purified hydrogen fluoride which can be obtained by the process according to the invention can be used as such in the electronics industry. After having carried out the process according to the invention, it is advantageous to charge suitable gas cylinders with the product.

Naturally, the hydrogen fluoride which has been purified according to the invention can also be used for the preparation of hydrofluoric acid. To this end, the hydrogen fluoride which has been purified according to the invention is mixed with suitably pure water, which gives a more or less concentrated hydrofluoric acid which is essentially free from carbon compounds.

Moreover, the hydrogen fluoride which has been purified by the process according to the invention can also be used as an intermediate for the preparation of fluorine compounds. For example, ultrapure fluorides or fluorine-containing carbon compounds can be prepared from suitable precursors by customary processes by using the ultrapure hydrogen fluoride which can be obtained by the process according to the invention.

The present invention makes it possible for the first time to reduce the content of water and (organic) carbon compounds in hydrogen fluoride in a simple manner to extremely low values down to the detection limit.

The invention will be described in further detail by the following examples which are merely illustrative and are not intended to limit its scope.

EXAMPLE 1

Purification of hydrogen fluoride under ambient pressure.

The apparatus used was a unit of a reaction vessel provided with an attached reflux condenser and a distillation head. 1,000 g of technical grade hydrogen fluoride gas were condensed into the reaction vessel. The HF-purity of the hydrogen fluoride was 99.99% by weight. As impurities, the hydrogen fluoride contained 80 ppm of water, 20 ppm of sulfur in sulfate form and approximately 500 ppm of arsenic. The total of the metal impurities was approximately 10 ppm. For testing purposes, the hydrogen fluoride gas was doped with 10 ppm of n-pentane. 7,500 ppm of lithium fluoride were then additionally introduced into the reaction vessel. A mixture of nitrogen and fluorine (volumetric ratio of nitrogen to fluorine approximately 9:1) was then passed into the reaction mixture. The total amount of fluorine introduced was approximately 0.16 mole. The stoichiometrically required amount would have been approximately 0.03 mole. After these components had been introduced, the hydrogen fluoride was distilled off, and the distillate was subsequently analyzed. The water content was analyzed by the Karl-Fischer method and the remaining components by means of ICP (Inductive Coupled Plasma), GFAAS (Graphite Furnace Atomic Absorption Spectroscopy) and headspace gas chromatography, coupled with mass spectroscopy (GC-MS). The water content and the contents of other impurities were in each case below the detection limit.

EXAMPLE 2

Purification of hydrogen fluoride using fluorine under pressure with added lithium fluoride.

The apparatus used this time was a pressurized cylinder having a volume of 3.8 liters. This pressurized cylinder was sealable and connected to a distillation device by means of a conduit which could be closed off.

The pressurized cylinder was filled with 2 liters of technical grade hydrogen fluoride. This hydrogen fluoride had the same composition as the hydrogen fluoride used in Example 1. Lithium fluoride was then introduced into the pressurized cylinder until the lithium fluoride content was approximately 15,000 ppm. The cylinder was subsequently charged with elemental fluorine until the pressure in the cylinder was approximately 5.3 bar. At this point in time, approximately 0.43 mole of $F_2$ was present in the pressurized cylinder; the stoichiometrically required amount would be 0.06 mole. The content of the pressurized cylinder was then brought to approximately 100° C. and kept at this temperature for 12 hours. To improve mixing of the contents, the pressurized cylinder was mechanically moved to and fro. The pressurized cylinder was then cooled to room temperature, and readily volatile components were discharged. The content of the pressurized cylinder was subsequently distilled. Again, the distillate was analyzed. The water content and the content of carbon compounds were each less than 1 ppm. Other impurities were also not present in more than minute trace amounts. For example, the sulfate concentration was less than 0.1 ppm, the arsenic concentration was less than 0.001 ppm, and the concentration of metal impurities was less than 0.005 ppm.

EXAMPLE 3

Purification of hydrogen fluoride using fluorine under pressure.

Example 2 was repeated except that no lithium fluoride was added. The purity of the hydrogen fluoride obtained corresponded to the product obtained in Example 2 with regard to its water content and content of carbon compounds.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations falling within the scope of the appended claims and equivalents thereof.

What is claimed:

1. A process for preparing purified hydrogen fluoride from hydrogen fluoride contaminated with at least one contaminant compound selected from the group consisting of hydrocarbons and organic carbon compounds containing carbon, hydrogen and at least one hetero atom, said process comprising the steps of:

contacting said contaminated hydrogen fluoride with elemental fluorine thereby converting the at least one contaminant compound into a product which is separable from hydrogen fluoride by distillation; and thereafter distilling said contaminated hydrogen fluoride and recovering purified hydrogen fluoride.

2. A process according to claim 1, wherein said hydrogen fluoride and said elemental fluorine are brought into contact with each other at a temperature of from −20° C. to 150° C.

3. A process according to claim 1, wherein water is added to the purified hydrogen fluoride to obtain hydrofluoric acid.

* * * * *